April 4, 1950     T. A. SCHERGER     2,503,071
MANIFOLD
Filed April 18, 1946     2 Sheets-Sheet 1
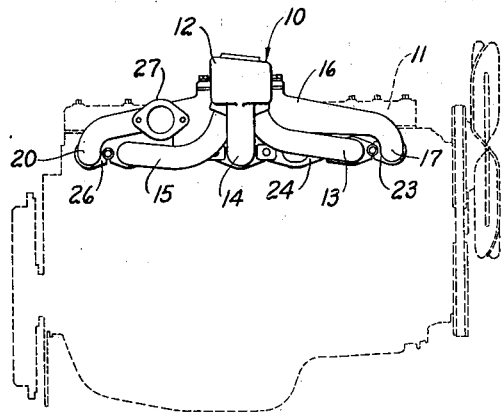
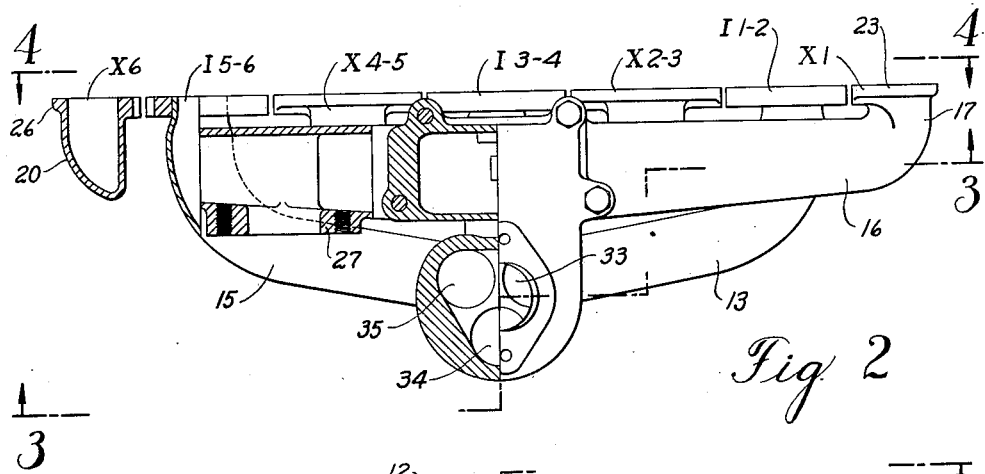
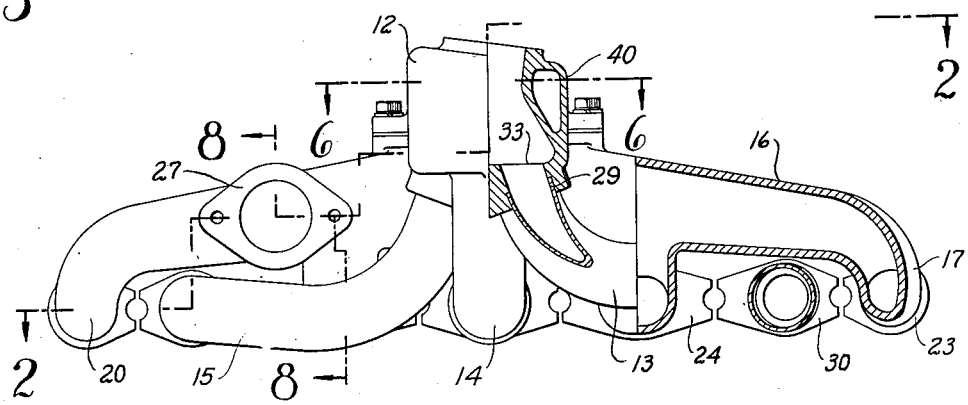
INVENTOR.
Thomas A. Scherger
ATTORNEYS.

April 4, 1950     T. A. SCHERGER     2,503,071
MANIFOLD
Filed April 18, 1946     2 Sheets-Sheet 2
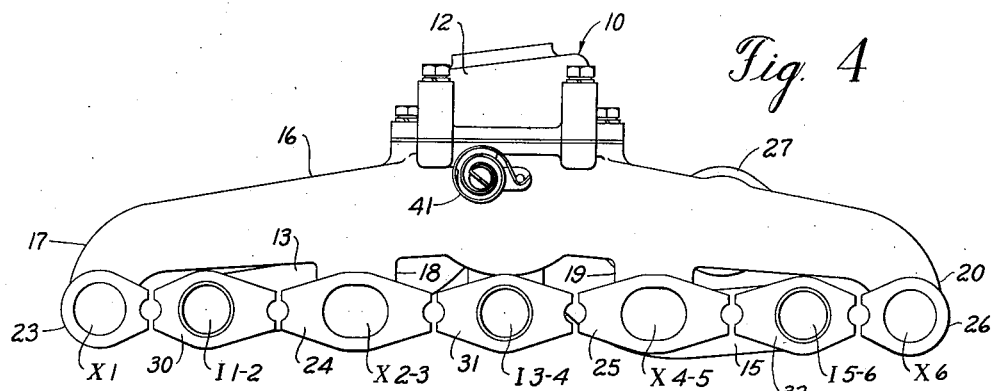
INVENTOR.
BY Thomas A. Scherger
Brown, Jackson, Boettcher & Dienner
ATTORNEYS.

Patented Apr. 4, 1950

2,503,071

UNITED STATES PATENT OFFICE 2,503,071

MANIFOLD

Thomas A. Scherger, South Bend, Ind., assignor to The Studebaker Corporation, South Bend, Ind., a corporation of Delaware Application April 18, 1946, Serial No. 663,047

5 Claims. (Cl. 123—52)

1

This invention relates, generally, to fuel mixture intake manifolds for internal combustion engines, and it has particular relation to such manifolds for use with automobile engines whereby a full, evenly mixed, fuel-air charge may be delivered to each cylinder.

The construction of the intake manifold for automobile engines commonly in use involves a header pipe extending along side the engine block with branch connections to the intake ports of the cylinders. With this type of construction it has been found that the fuel-air charge delivered to the various cylinders is by no means uniform. Some cylinders are starved while others receive excessive amounts of the fuel mixture. Thus, suction to one of the cylinder intake ports may exhaust the fuel mixture not only from the header pipe but also from adjacent branch pipes into other cylinders. When suction follows in these adjacent branch pipes there will be an insufficient amount of the fuel mixture available. Obviously, for maximum efficiency and optimum performance, each cylinder must receive a uniform fuel mixture charge which is intimately blended and mixed.

The object of this invention, generally stated, is the provision of a fuel intake manifold of such construction that a substantially uniform, intimately blended, fuel-air mixture will be delivered to the cylinders of an internal combustion engine provided with the manifold.

An important object of the invention is the provision of a fuel intake manifold for internal combustion engines, particularly automobile engines, having a mixing or blending chamber wherein suction by separate branch intake pipes creates a swirling action of the fuel mixture so as to not only intimately blend the mixture but also separate it from the contents of the branch pipes so that the tendency for one or more of the pipes to receive more than the predetermined uniform fuel mixture charge will be minimized.

Another important object of the invention is the provision of a fuel mixture intake manifold, of the class described, wherein the branch intake pipes are so connected with the fuel mixing chamber in regard to the firing order of the engine to which the manifold is attached, that the suction induced in the chamber by the separate intake pipes will create swirling of the fuel mixture within the mixing chamber, alternately in opposite rotative directions.

Other objects of the invention will, in part, be obvious, and will in part appear hereinafter.

For a more complete understanding of the nature and scope of the invention, reference may now be had to the following detailed description thereof, taken in connection with the accompanying drawings, wherein;

Figure 1 is a side elevational view of a fuel mixture intake manifold forming one embodiment of this invention combined with an exhaust manifold section, and showing in broken outline a representative automobile engine to which the manifold may be attached;

Figure 2 is a view partly in plan and partly in section of the embodiment of my invention herein disclosed, and taken substantially on the line 2—2 of Figure 3;

Figure 3 is a partly in side elevation, and partly vertical section, of the manifold of Figures 1 and 2 with the part in section being taken substantially on line 3—3 of Figure 2 looking in the direction indicated by the arrows;

Figure 4 is a side elevational view of the manifold of Figures 1 and 2 taken on the side to which it is attached to the automobile engine as indicated by line 4—4 of Figure 2;

Figure 5 is a vertical sectional view of a portion of the intake manifold of Figure 1, taken on line 5—5 of Figure 6;

Figure 6 is a fragmentary horizontal sectional view taken on line 6—6 of Figure 3;

Figure 7 is a fragmentary vertical sectional view taken on line 7—7 of Figure 6; and Figure 8 is a sectional view taken on line 8—8 of Figure 3.

Referring to Figure 1 of the drawings, a manifold is indicated generally at 10 which is shown attached to a six cylinder automobile engine 11 represented in broken outline. The manifold 10 consists of a fuel mixture intake manifold combined with an exhaust manifold. The intake section of the manifold 10 consists of a fuel mixing or blending chamber 12 and three separate branch fuel mixture conduits or pipes 13, 14 and 15 connecting the chamber 12 with adjacent pairs of cylinders of the engine 10. According to the standard method of numbering the cylinders from front to rear, branch pipe 13 is connected with cylinders 1 and 2, branch 14 is connected with cylinders 3 and 4, and branch 15 is connected with cylinders 5 and 6.

The exhaust section of the manifold 10 does not form a part of this invention, but it is shown in the drawings in order that a complete manifold structure may be illustrated. The exhaust manifold comprises a header pipe 16 (see Figure 4) with branches 17, 18, 19 and 20 connecting with the discharge ports of the engine 11.

The branch 17 terminates in a flanged end 23 for connection to cylinder 1. Branch 18 terminates in a flanged end 24 for connection to cylinders 2 and 3. Exhaust branch 19 terminates in a flanged end 25 for connection with cylinders 4 and 5. And, branch 20 terminates in a flanged end 26 for connection with cylinder 6. The outlet connection for the exhaust manifold 16 is at 27.

Branch conduit 13 of the intake section of the manifold 10 terminates in a flanged end 30 for connection to cylinders 1 and 2, branch conduit 14 terminates in a flanged end 31 for connection with cylinders 3 and 4, and branch 15 generally terminates in a flanged end 32 for connection to cylinders 5 and 6. The several connections above described are indicated in Figures 2 and 4, with the numbers 1 through 6 indicating the six cylinders of the engine, and with the letter X indicating exhaust and the letter I indicating intake. At their opposite ends, the feed branches 13, 14 and 15 connect with suitable outlet openings in the base of the mixing chamber 12. The manner in which branch conduit 13 connects with outlet opening 33 of the chamber 12 is shown in detail in Figure 3 at 29. Branches 14 and 15 connect in a similar way with openings 34 and 35, respectively.

The details of construction of the mixing chamber 12 are best shown in connection with Figures 2, 3 and 5 of the drawings. The chamber 12 is disposed above the outlet ends of the branch pipes 13, 14, and 15 and is supported thereby in an upright position. The chamber 12 has an inlet opening 36 at the top and in shape conforms generally to a truncated tetrahedron having rounded corners. The bottom of the chamber 12 is in the form of an equilateral triangle with rounded apexes or corners. It is at these corners or apexes that the outlet openings 33, 34 and 35 lie.

The branch conduits 13, 14 and 15 are connected to the chamber 12 in the manner shown, having taken into regard the fact that the firing order of the engine 11 is as follows:

1—5—3—6—2—4—1

Following through one complete firing cycle of the engine 11, suction is first created in branch 13 and outlet opening 33. Next, suction is created in branch 15 and outlet opening 35, followed by suction in branch 14 and outlet opening 34. Next, suction is created in branch 15 and outlet opening 35, followed by suction in branch 13 and outlet opening 33. Thereupon, suction next follows in branch 14 and outlet opening 34. This completes one cycle and at the start of the next, suction is again created in branch 13 and opening 33 and the cycle is repeated in the order outlined above. It will thus be seen that in the outlet openings 33, 34 and 35, suction first travels around in one direction and then reverses and travels around in the opposite. In this manner a swirling action of the contents in the chamber 12 is created around its vertical axis 37 (Figure 5), which swirling is alternately in opposite directions thereabout. This swirling serves to effectually separate the contents of the chamber 12 from the branches 13, 14 and 15. Although upon suction therein each of the branches 13, 14 and 15 can readily withdraw a uniform fuel-air charge from the chamber 12, the separation created by the swirling is sufficient so that upon suction in one of the branches there is practically no tendency to exhaust one of the other branches. Thus, the particular arrangement of the outlet openings 33, 34 and 35 in the bottom of the upright mixing chamber 12 is an important feature of the invention.

Although the axis of swirl 37 of the chamber 12 is shown vertical, and the outlet openings 33, 34 and 35 lie in a plane at right angles to this axis, it will be understood that the axis 37 could extend in an other than vertical direction so long as the plane of the outlet openings is substantially at right angles thereto. However, the particular arrangement shown in the drawings is to be preferred.

In order to preheat the fuel mixture within the chamber 12 when the engine 11 is cold, such as upon initial starting a jacket 40 is integrally formed thereabout through which hot exhaust gases from cylinders 1, 2 and 3 may be circulated under control of a thermostatic element 41 (Figure 4). The thermostatic element 41 is arranged so as to actuate and control a damper 42 as shown in Figure 7. When the engine 11 is cold, the thermostat 41 places the damper 42 in the position shown in Figure 7 so as to block the direct flow of exhausts from cylinders 1, 2 and 3, through the exhaust header 16 and out through the exhaust outlet 27. The blocking by the damper or baffle 42 causes the gases to circulate through the jacket 40 and thus warm the fuel mixture contents therein. The hot exhaust gases from cylinders 1, 2 and 3 pass through the jacket 40 as indicated by the arrows in Figures 6 and 7.

Having fully described in detail a presently preferred embodiment of the invention, it will be understood that changes and modifications may be made therein and that the invention may be provided in other embodiments, without departing from the scope thereof.

I claim:

1. In combination with a six-cylinder, straight-line, internal combustion engine having a firing order from front to rear of 1—5—3—6—2—4, a fuel mixture intake manifold, comprising, in combination, a separate branch conduit connected to cylinders 1 and 2, a separate branch conduit connected to cylinders 3 and 4, a separate branch conduit connected to cylinders 5 and 6, and a mixing chamber adapted to have a fuel mixture swirl therein around an axis thereof and having three fuel outlet openings lying generally in a plane at a right angle to said axis of swirl and with the openings arranged in a closed path and substantially equi-distant apart, said mixing chamber corresponding generally in shape to a truncated tetrahedron having rounded corners, with the vertical axis coinciding with said axis of swirl, and with said fuel outlet openings lying at the apexes of the equilateral triangle forming the base of said chamber, each of said separate branch conduits being connected with one of said fuel outlet openings and in such an order that said firing order causes suction in said conduits around said path of fuel outlet openings alternately in opposite directions.

2. The structure called for in claim 1 wherein said axis of swirl is at least substantially vertical and said plane is at least substantially horizontal.

3. The structure called for in claim 1 wherein said mixing chamber is adapted to be disposed above the positions where said separate branch conduits are adapted to be connected to said cylinders.

4. In combination with a multi-cylinder internal combustion engine having at least six cylinders and an even number of cylinders, a fuel mixture intake manifold, comprising in combination, a separate branch conduit connected in fuel feeding relationship with adjacent pairs of cylinders of said engine which do not fire successively, and a mixing chamber adapted to have a fuel mixture swirl therein around an axis thereof and having fuel outlet openings corresponding in number to the number of said separate branch conduits, said fuel outlet openings lying generally in a plane at a right angle to said axis of swirl and with the outlet openings arranged in a closed path and substantial equi-distant apart, said mixing chamber corresponding generally in shape to a truncated tetrahedron having rounded corners, with the vertical axis coinciding with said axis of swirl, and with said fuel outlet openings lying at the apexes of the equilateral triangle forming the base of said chamber, said separate branch conduits being connected with said fuel outlet openings in an order dependent upon the firing order of said engine whereby during each firing cycle suction will be first successively applied to said outlet openings in one direction around said closed path and then successively applied to said outlet openings in the reverse direction around said closed path.

5. For combination with a six-cylinder, straight-line, automobile internal combustion engine having a firing order from front to rear of 1—5—3—6—2—4, a fuel mixture intake manifold, comprising, in combination, a separate branch conduit adapted to be connected to cylinders 1 and 2, a separate branch conduit adapted to be connected to cylinders 3 and 4, a separate branch conduit adapted to be connected to cylinders 5 and 6, and a mixing chamber adapted to have a fuel mixture swirl therein around an axis thereof and having three fuel outlet openings lying generally in a plane at a right angle to said axis of swirl and with the openings arranged in a closed path and substantially equi-distant apart, said separate branch conduits being connected with said fuel outlet openings, said mixing chamber corresponding generally in shape to a truncated tetrahedron having rounded corners, with the vertical axis coinciding with said axis of swirl, and with said fuel outlet openings lying at the apexes of the equilateral triangle forming the base of said chamber.

THOMAS A. SCHERGER.

REFERENCES CITED

The following references are of record in the file of this patent:

UNITED STATES PATENTS

| Number | Name | Date |
| --- | --- | --- |
| 1,150,264 | Greer | Aug. 17, 1915 |
| 1,745,020 | Lawrence | Jan. 28, 1930 |
| 1,912,047 | Suczek | May 30, 1933 |
| 2,066,923 | Wolfard | Jan. 5, 1937 |
| 2,117,983 | Reid | May 17, 1938 |